Figure 1:
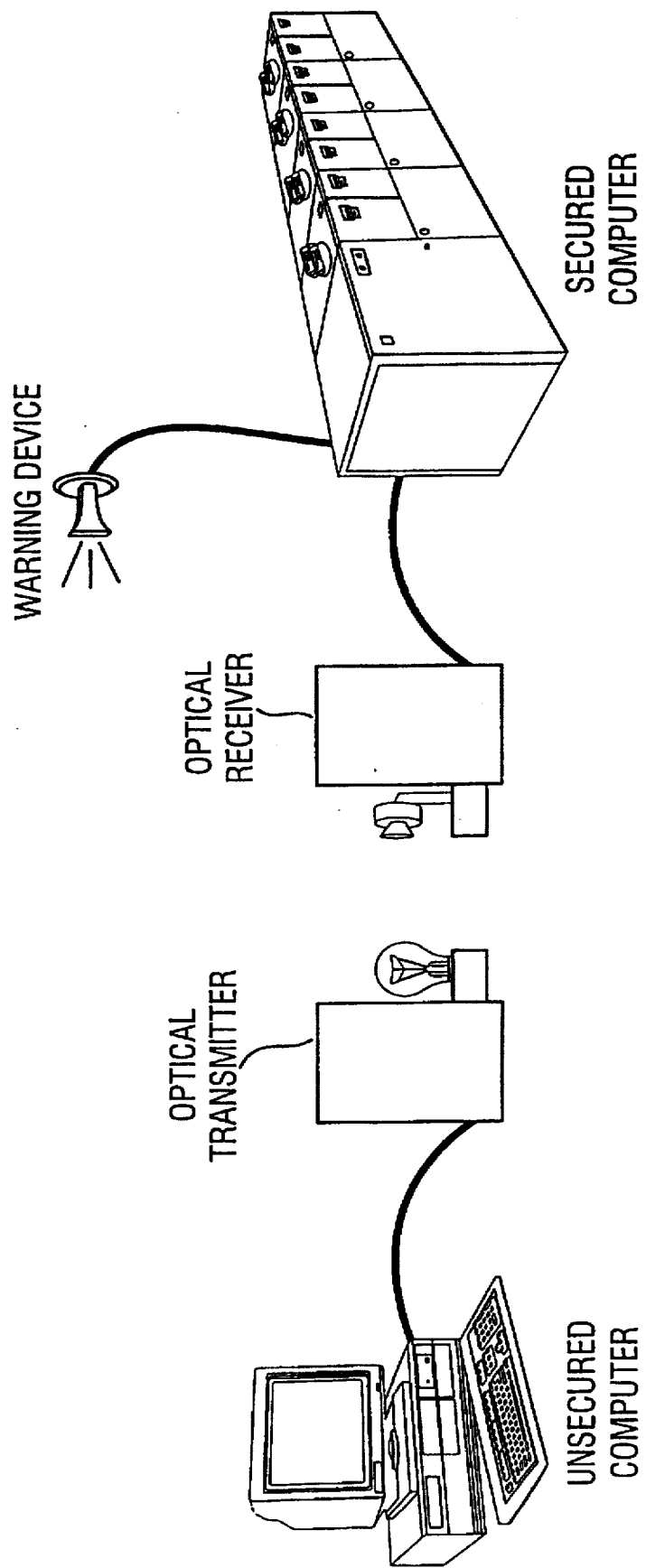

United States Patent [19]

Nilsen

[11] Patent Number: 5,703,562
[45] Date of Patent: Dec. 30, 1997

[54] METHOD FOR TRANSFERRING DATA FROM AN UNSECURED COMPUTER TO A SECURED COMPUTER

[75] Inventor: Curt A. Nilsen, Castro Valley, Calif.

[73] Assignee: Sandia Corporation, Albuquerque, N. Mex.

[21] Appl. No.: 753,130

[22] Filed: Nov. 20, 1996

[51] Int. Cl.$^6$ .................................................. G08B 9/00
[52] U.S. Cl. ............. 340/286.02; 340/555; 340/825.34; 359/145; 359/152; 371/33; 371/34; 371/69.1; 395/182.16
[58] Field of Search ............... 395/200.14, 182.16; 359/110, 145, 152, 174; 340/555, 556, 557, 286.02, 825.34; 371/20.1, 30, 33, 34, 69.1, 68.2

[56] References Cited

U.S. PATENT DOCUMENTS

| | | | |
|---|---|---|---|
| 4,070,648 | 1/1978 | Mergenthaler et al. | 371/34 |
| 4,549,297 | 10/1985 | Nishimoto | 371/33 |
| 4,866,707 | 9/1989 | Marshall et al. | 371/33 |
| 5,142,538 | 8/1992 | Fickes et al. | 371/34 |
| 5,241,548 | 8/1993 | Dillon et al. | 371/69.1 |
| 5,343,319 | 8/1994 | Moore | 359/152 |
| 5,463,646 | 10/1995 | Dillon et al. | 371/69.1 |
| 5,629,948 | 5/1997 | Hagiwara et al. | 371/34 |

*Primary Examiner*—Jeffrey Hofsass
*Assistant Examiner*—Timothy Edwards, Jr.
*Attorney, Agent, or Firm*—Kurt C. Olsen; Donald A. Nissen

[57] ABSTRACT

A method is described for transferring data from an unsecured computer to a secured computer. The method includes transmitting the data and then receiving the data. Next, the data is retransmitted and rereceived. Then, it is determined if errors were introduced when the data was transmitted by the unsecured computer or received by the secured computer. Similarly, it is determined if errors were introduced when the data was retransmitted by the unsecured computer or rereceived by the secured computer. A warning signal is emitted from a warning device coupled to the secured computer if (i) an error was introduced when the data was transmitted or received, and (ii) an error was introduced when the data was retransmitted or rereceived.

15 Claims, 4 Drawing Sheets

METHOD FOR TRANSFERRING DATA FROM AN UNSECURED COMPUTER TO A SECURED COMPUTER

1. BACKGROUND OF THE INVENTION

The invention relates to a method for transferring data to a secured computer. The method is particularly useful for transferring data from an unsecured computer to a secured computer.

This invention was made with Government support under contract no. DE-AC0494-AL85000 awarded by the U.S. Department of Energy to Sandia Corporation. The Government has certain rights in the invention.

One of the foremost aspects of computer security is the protection of a computer against undesired data disclosure. Computer security was originally of concern because of requirements to protect government and military classified data. However, with today's industrial espionage and hacker penetrations, computer security is of concern to a significant portion of computer administrators.

One method of preventing undesired data disclosure is to isolate a secured computer from all unsecured computers. Thus, when data needs to be input into the secured computer, a floppy disk or other similar storage device is inserted into an unsecured computer. The unsecured computer then stores the data onto the floppy disk. Next, the floppy disk is removed from the unsecured computer and then transported to the secured computer. Finally, the secured computer reads the data.

The above described method is not optimal. First, because the method involves insertion and removal of floppy disks, the method is difficult to automate. While robots may be programmed to perform such tasks, robots are quite expensive. In addition, because of the delays in transferring floppy disks, the secured computer will not have access to real-time or near real-time data. Further, once a floppy disk is inserted into a secured computer, the floppy disk becomes "classified" and may never be used in an unsecured computer again. Hence, if large amounts of data needs to be transferred frequently, then large amounts of floppy disks may be consumed. The costs of purchasing and handling such floppy disks may be significant.

Sophisticated methods are currently being used to protect secure computers from undesired data disclosure. Such methods utilize personal transaction devices such as smart cards and tokens, biometric verifiers, port protection devices, encryption, authentication, and digital signature techniques. However, regardless of the type of protective measures utilized, if a secured computer has the ability to transfer data to an unsecured computer, then undesired data disclosure is possible. Because all the above sophisticated methods allow, under limited circumstances, a secured computer to transfer data to an unsecured computer, vulnerabilities exist.

A method is needed that allows real-time or near real-time data to be transferred to a secure computer without enabling the secured computer to transfer data to an unsecured computer.

2. SUMMARY OF THE INVENTION

The invention relates to a method for transferring data from an unsecured computer to a secured computer. The method includes transmitting the data and then receiving the data. Next, the data is retransmitted and rereceived. Then, it is determined if errors were introduced when the data was transmitted by the unsecured computer or received by the secured computer. Similarly, it is determined if errors were introduced when the data was retransmitted by the unsecured computer or rereceived by the secured computer. A warning signal is emitted from a warning device coupled to the secured computer if (i) an error was introduced when the data was transmitted or received, and (ii) an error was introduced when the data was retransmitted or rereceived.

3. BRIEF DESCRIPTION OF THE DRAWINGS

FIG. 1 presents a diagram of a secure transfer system.

Figure 2:
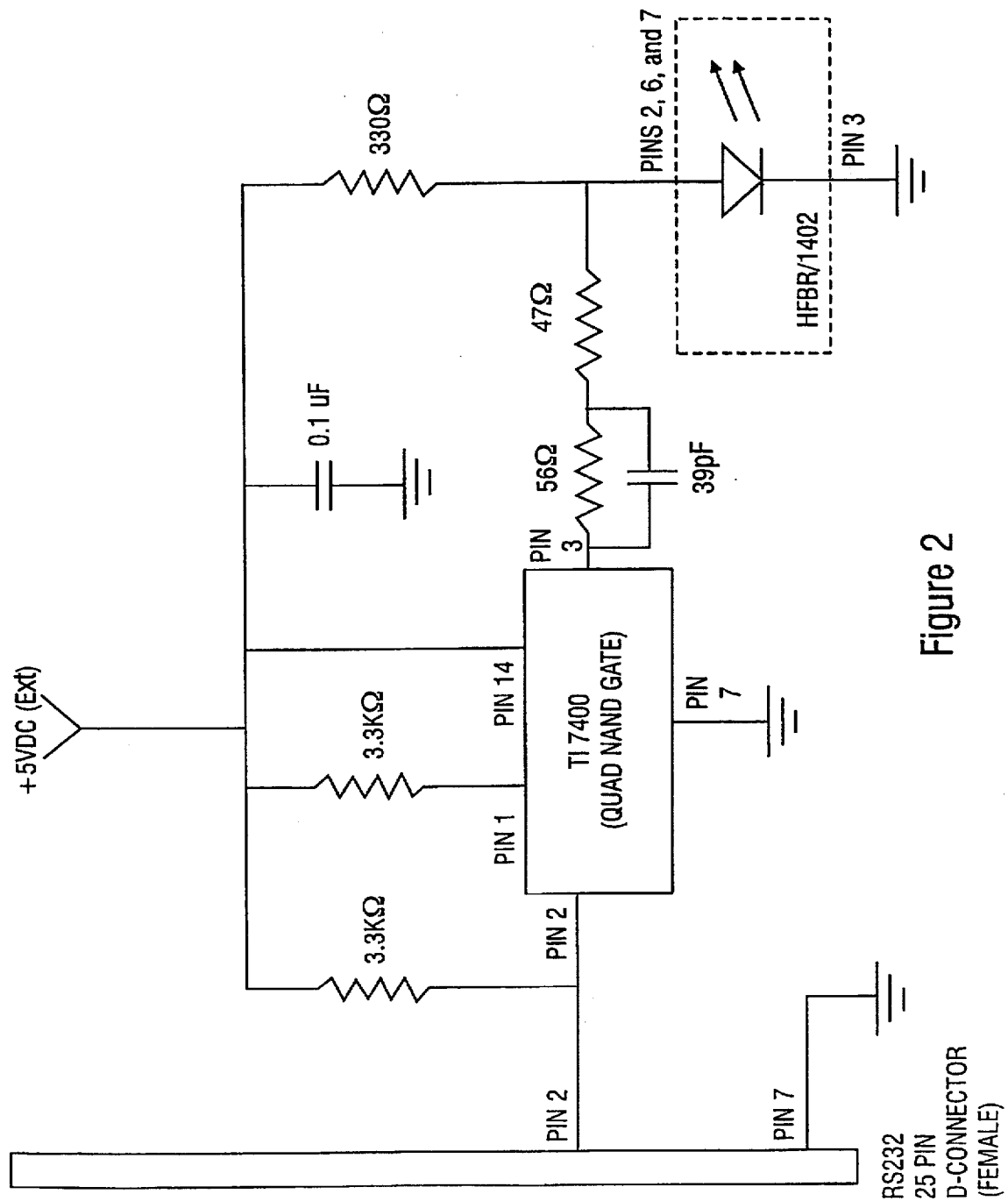

FIG. 2 presents a circuit for converting serial data into infra-red optical transmissions.

Figure 3:
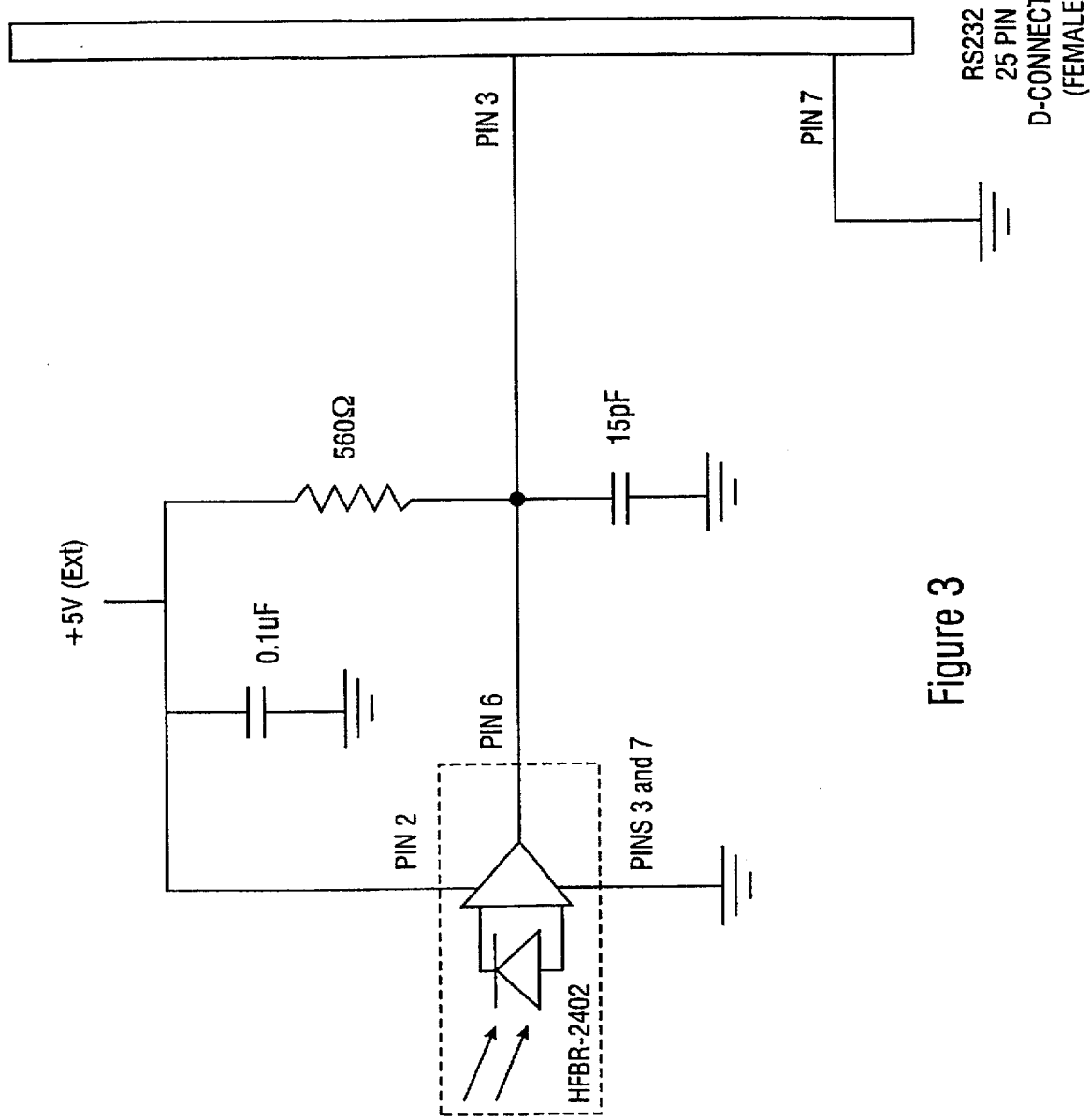

FIG. 3 presents a circuit for converting infra-red transmissions to serial data.

Figure 4:
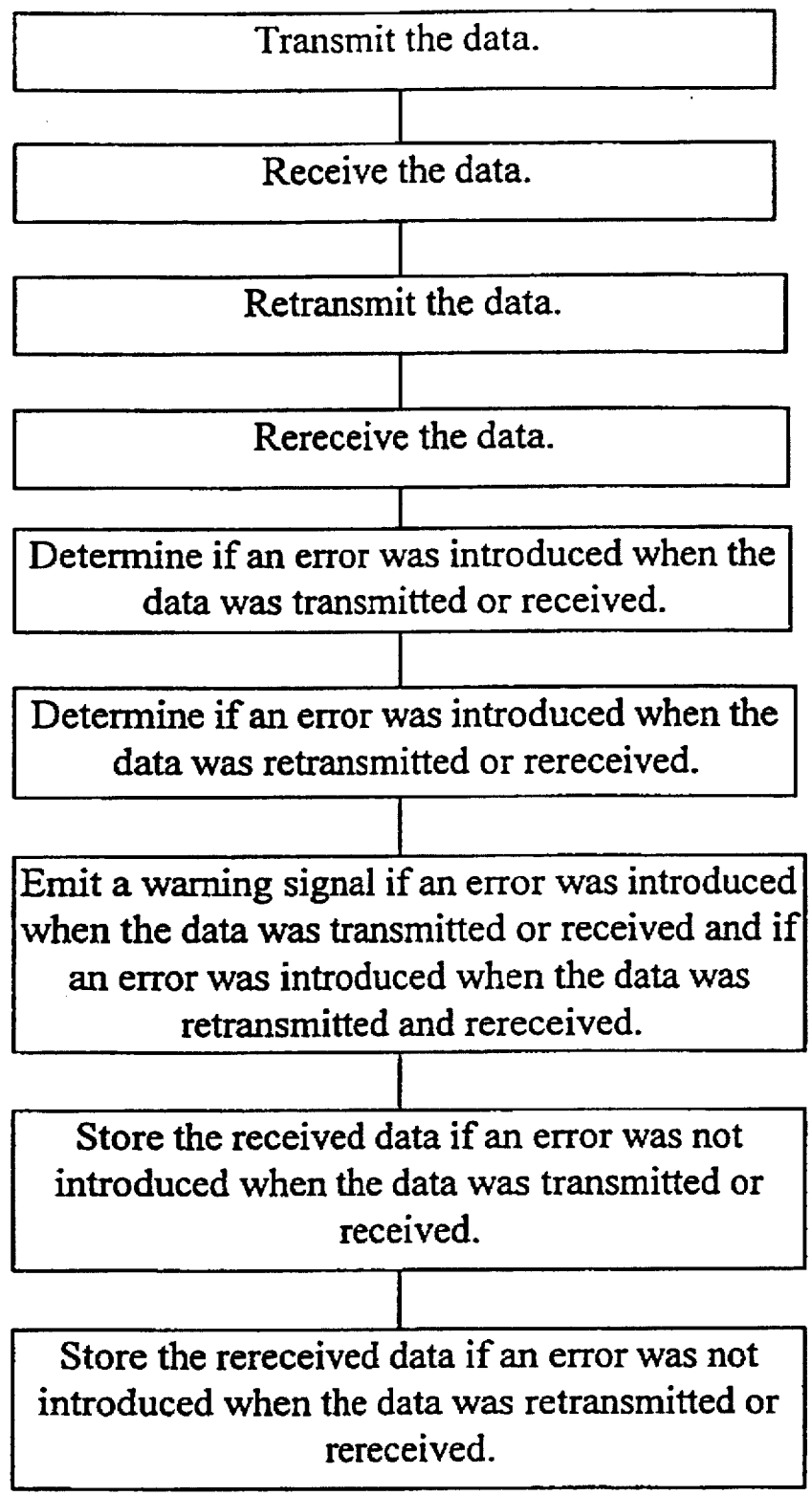

FIG. 4 is a flow chart of a method for transferring data from an unsecured computer to a secured computer.

4. DETAILED DESCRIPTION OF SPECIFIC EMBODIMENTS

FIG. 1 presents a diagram of a secure transfer system. The secure transfer system consists of an unsecured computer, an optical transmitter, an optical receiver, and a secured computer.

4.1 Unsecured computer

The unsecured computer in the secure transfer system may be any general purpose computer. Examples of such computers include: IBM compatible personal computers, Apple computers, computer workstations such as those produced by SUN, DEC, and IBM, and mainframe computers. Alternatively, the unsecured computer may be a special purpose computer such as a micro-controller, a digital signal processor (DSP), or an embedded computer. Any computer will suffice as long as it contains an output port that can be coupled to an optical transmitter. Common output ports include serial ports, parallel ports, and even SCSI ports. In certain circumstances, a RS-232 serial port may be optimal.

4.2 Optical transmitter

Referring again to FIG. 1, the unsecured computer is coupled to an optical transmitter. The optical transmitter receives data from the unsecured computer and transmits the same data optically. The optical transmitter may transmit the data using an infra-red light-emitting-diode (IR LED). Alternatively, the optical transmitter may transmit the data using a LASER, a lightbulb, or even a fluorescent lamp. A primary advantage of using an optical transmitter, is that the transmission is inherently unidirectional. Thus, because no optical transmitter is coupled to the secured computer, undesired data disclosure is not possible.

While numerous variations of the optical transmitter are possible, an IR LED, such as Hewlett Packard's HFBR/1402, may be optimal in certain circumstances. A circuit for converting serial data into infra-red optical transmissions is shown in FIG. 2. Circuits for converting serial data into infra-red optical transmissions are known in the art.

4.3 Optical receiver

Referring again to FIG. 1, an optical receiver is placed so that it may receive the optical transmissions from the optical transmitter. Typically, the optical receiver is separated from the optical transmitter by an air gap. However, the optical receiver and the optical transmitter may be separated by a fiber optical cable. Alternatively, the optical receiver and the optical transmitter may be separated by a material that is transparent to the optical transmissions. For example, germanium may be placed between the optical transmitter and the optical receiver if the optical transmissions are infra-red optical transmissions. Such a material may be part of a barrier that isolates the secured computer from unsecured areas.

It may be optimal to separate the optical transmitter from the optical receiver in order to eliminate reception of any TEMPEST emanations from the secured computer. As is well known by those skilled in the art, electromagnetic and/or conductive leakage of data may be recovered remotely. However, these emanations decrease rapidly with distance.

A circuit for convening infra-red transmissions to serial data is shown in FIG. 3. Circuits for converting infra-red transmissions to serial data are known in the art.

4.4 Secured computer

Referring again to FIG. 1, a secured computer is coupled to the optical receiver. The secured computer may be any general purpose or special purpose computer as discussed above. Typically, the secured computer will be isolated from all unsecured computers. Any computer will suffice as long as it contains an input port that can be coupled to the optical receiver. Common input ports include serial ports, parallel ports, and even SCSI ports. In certain circumstances, a RS-232 serial port may be optimal. The secured computer also may contain a warning device. The warning device emits an audible warning signal upon the occurrence of certain events. The warning device may be a conventional speaker within a conventional IBM compatible personal computer. Alternatively, the warning device may be a larger speaker driven by an amplifier that is external to the secured computer. In other embodiments, the warning device may be a computer display coupled to the secured computer.

4.5 Method of operation

A flow chart for a method for transferring data from an unsecured computer to a secured computer is presented in FIG. 4.

4.5.1 Transmit the data

Referring to FIG. 4, the first step in the method is transmitting data from the optical transmitter. The data may be any combination of binary bits. In some embodiments the data may be a single byte. In other embodiments, the data may consist of one or more files of information. The data may contain encrypted information or unencrypted information. In an effort to enable error checking, the data may include parity bits, checksums, error detection codes or error correction codes. Parity bits, checksums, error detection codes, and error correction codes are known in the art.

In this step, data from the unsecured computer is converted from electrical signals into optical transmissions. These optical transmissions emit from the optical transmitter and may optionally pass through air, one or more fiber optic cables, and/or other transparent mediums before reaching the optical receiver.

4.5.2 Receiving the data

Referring again to FIG. 4, the next step in the method is receiving the transmitted data. In this step, the received optical transmissions are converted into electrical signals in the secured computer.

4.5.3 Retransmitting the data

The next step in the method is retransmitting the data. Because the secure transfer system does not allow the secured computer to transfer data to the unsecured computer, there can be no data "handshaking." The lack of handshaking, however, may be overcome by sending the data multiple times regardless of whether errors were introduced when the data was previously transmitted and received. Thus, the data from the unsecured computer is again converted from electrical signals into optical transmissions.

4.5.4 Rereceiving the data

Referring again to FIG. 4, the next step in the method is rereceiving the data. Just as when the data was initially received, the optical transmissions are again converted into electrical signals in the secured computer.

4.5.5 Determining if errors were introduced when the data was transmitted or received Referring again to FIG. 4, the next step in the method is determining if errors were introduced when the data was transmitted or received. This step may be performed by utilizing conventional parity or checksum calculations. Alternatively, conventional error detection or error corrections calculations may be utilized. Further, other error detection calculations that are known in the art may be utilized.

4.5.6 Determining if errors were introduced when the data was retransmitted or rereceived The next step in the method is determining if errors were introduced when the data was retransmitted or rereceived. This step may be performed as discussed in section 4.5.5.

4.5.7 Emitting a warning signal from a warning device

Referring again to FIG. 4, if errors were introduced when the data was transmitted and received or if errors were introduced when the data was retransmitted and rereceived, then the warning device coupled to the secured computer emits a warning signal. This warning signal indicates that both the received data and the rereceived data contain errors. The warning signal may be utilized to instruct an operator to transfer the data again at a later time. In one embodiment, the warning signal may be a single long duration tone.

4.5.8 Storing the data

If no errors were introduced when the data was transmitted and received, then the received data may be stored in a storage device in the secured computer. Similarly, if no errors were introduced when the data was retransmitted and rereceived, then the rereceived data may be stored in a storage device in the secured computer. Common storage devices include floppy disk drives, hard disk drives, CD ROMs or other optical or magnetic-optical disks, and magnetic tapes.

4.6 Alternative embodiments

While the method shown in FIG. 4 indicates retransmitting the data only once, the data may be retransmitted multiple times. These multiple retransmissions and their corresponding rereceptions increase the opportunities for error free transfers. In some embodiments, data may be retransmitted at predetermined delay intervals.

In another embodiment, the warning device may be utilized to provide an audible signal that either (1) no errors were introduced when the data was transmitted and received or that (2) no errors were introduced when the data was retransmitted and rereceived. This signal may be two short duration tones.

In one embodiment, the unsecured computer may execute software that enables an operator to issue a command that will optically transmit predetermined data. The transmitted predetermined data will be received by the secured computer. If the received data matches the predetermined data, then the warning device may be utilized to provide an audible signal that no errors were introduced when the predetermined data was transmitted and received.

In another embodiment, the unsecured computer may transmit the transfer time, the transfer date, the file checksum, and/or the file size for each file that is transmitted.

In still another embodiment, the unsecured computer will store on a storage device a copy of each file that was transferred to the secured computer. The copy of transferred files may be stored in a "circular file." By storing a copy of each file that was transferred, an operator may rapidly retransfer a file if necessary. The size of the circular file may be user definable. Thus, users may easily retransmit data.

In addition, the unsecured computer may keep a "traffic summary" that includes the names of the files transferred to the secured computer and the times that the files were transferred. This traffic summary may be transmitted to the secured computer at predetermined intervals. The traffic summary may contain the number and names of the files that were transferred during a predetermined number of intervals. The information contained within the traffic summary may allow the secured computer to detect that it has not received a transferred file. If such a detection is made, then the secured computer may emit a warning signal.

5. REMARKS

Any of the foregoing methods may be implemented by programming a general or special purpose computer. The programming may be accomplished through the use of a program storage device readable by the general or special purpose computer and encoding a program of statements executable by the computer for performing the operations described above. The program storage device may take the form of one or more floppy disks, a hard disk, a CD ROM or other optical or magnetic-optical disk, a magnetic tape, a read-only memory chip (ROM), and other forms of the kind well-known in the art or subsequently developed. The program of statements may be object code, or a high-level language, or in some intermediate form such as partially compiled code. The precise forms of the program storage device and of the encoding of statements are immaterial.

A primary advantage of the secure transfer system is that it does not allow, under any circumstances, a secured computer to transfer data to an unsecured computer. Thus, one may be assured that no undesired data disclosures will occur.

Another advantage of the secure transfer system is that it enables real-time or near real-time data transfer. Thus, the secured computer will have access to real-time or near real-time data.

Still another advantage of the secure transfer system is that the system is very economical. It is estimated that the hardware (excluding the computers) may be obtained for less than $100 in production quantities.

It will be appreciated by those of ordinary skill having the benefit of this disclosure that the illustrative embodiments described above are capable of numerous variations without departing from the scope and spirit of the invention. For example, while the described steps in the method for transferring data from an unsecured computer to a secured computer are presented in a particular order, the order of the steps may be modified. Accordingly, the exclusive rights sought to be patented are as described in the claims below.

What is claimed is:

1. A method for transferring data from an unsecured computer to a secured computer, the method comprising:
   (a) transmitting the data;
   (b) receiving the data;
   (c) retransmitting the data;
   (d) rereceiving the data;
   (e) determining if an error was introduced when the data was transmitted by the unsecured computer or received by the secured computer;
   (f) determining if an error was introduced when the data was retransmitted by the unsecured computer or rereceived by the secured computer; and
   (g) emitting an warning signal from a warning device coupled to the secured computer if:
      (i) an error was introduced when the data was transmitted or received, and
      (ii) an error was introduced when the data was retransmitted or rereceived.

2. The method of claim 1 further comprising:
   (h) storing the received data on a storage device coupled to the secured computer if an error was not introduced when the data was transmitted or received.

3. The method of claim 1 further comprising:
   (h) storing the rereceived data on a storage device coupled to the secured computer if an error was not introduced when the data was retransmitted or rereceived.

4. The method of claim 1, wherein the data is transmitted and retransmitted optically.

5. The method of claim 1, wherein the data is transmitted and retransmitted by an IR LED.

6. The method of claim 1, wherein the data is transmitted and retransmitted by a LASER.

7. The method of claim 1, further comprising:
   (h) if an error was not introduced when either (i) the data was transmitted and received or (ii) when the data was retransmitted and rereceived, then emitting an audible signal.

8. The method of claim 1, further comprising:
   (g) transmitting a traffic summary to the secured computer.

9. The method of claim 1, further comprising:
   (g) transmitting a traffic summary to the secured computer at predetermined intervals.

10. A secure transfer system comprising:
   (a) an unsecured computer;
   (b) a transmitter operatively coupled to the unsecured computer, the transmitter for transmitting and retransmitting data from the unsecured computer;
   (c) a receiver for receiving data transmitted from the transmitter and for rereceiving data retransmitted from the transmitter; and
   (d) a secured computer operatively coupled to the receiver, the secured computer having a warning device for emitting a warning signal if (i) an error was introduced when the data was transmitted or received and (2) an error was introduced when the data was retransmitted or rereceived.

11. The secure transfer system of claim 10, wherein the transmitter is an optical transmitter.

12. The secure transfer system of claim 10, wherein the transmitter includes an IR LED.

13. The secure transfer system of claim 10, wherein the transmitter includes a LASER.

14. The secure transfer system of claim 10, wherein the warning device is an audible warning device.

15. The secure transfer system of claim 10, wherein the warning device is a speaker.

* * * * *